US006387480B1

(12) United States Patent
Komada et al.

(10) Patent No.: US 6,387,480 B1
(45) Date of Patent: May 14, 2002

(54) SETTER FOR DEFATTING AND/OR FIRING AND METHOD FOR PRODUCING THE SAME (75) Inventors: Norikazu Komada; Kazunori Adachi, both of Omiya (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/512,797

(22) Filed: Feb. 25, 2000

(30) Foreign Application Priority Data

| Feb. 10, 1999 | (JP) | ........................................ 2000-032572 |
| Feb. 26, 1999 | (JP) | .......................................... 11-049668 |
| Oct. 29, 1999 | (JP) | .......................................... 11-309631 |

(51) Int. Cl.[7] ............................. B32B 3/00; B32B 3/26; B32B 7/02
(52) U.S. Cl. .................. 428/316.6; 428/218; 428/313.9
(58) Field of Search ............................. 428/218, 316.6, 428/313.9

(56) References Cited

U.S. PATENT DOCUMENTS

| 4,812,424 A | * | 3/1989 | Helferich et al. ............ 106/602 |
| 4,971,738 A | * | 11/1990 | Herron et al. ............ 156/89.18 |
| 5,053,361 A | * | 10/1991 | Herron et al. ............... 501/103 |
| 5,130,067 A | * | 7/1992 | Flaitz et al. .............. 156/89.11 |
| 5,139,975 A | * | 8/1992 | Herron et al. ............... 428/137 |
| 5,620,637 A | * | 4/1997 | Kaga et al. .................. 264/650 |
| 5,804,324 A | * | 9/1998 | Niwa et al. .................. 428/325 |
| 5,840,436 A | * | 11/1998 | Hanzawa et al. ............ 428/134 |
| 6,015,517 A | * | 1/2000 | Casey ........................... 264/44 |
| 6,057,030 A | * | 5/2000 | Mano ........................... 264/44 |
| 6,146,549 A | * | 11/2000 | Mackay et al. .............. 252/373 |

* cited by examiner

*Primary Examiner*—Tom Dunn
*Assistant Examiner*—Zidia Pittman
(74) *Attorney, Agent, or Firm*—Oblon, Spivak, McClelland, Maier & Neustadt, P.C.

(57) ABSTRACT

A method for producing a setter for defatting and/or firing, which can produce the setter without using any mold, and which can minimize generation of gas in the firing step of a process for producing the setter. The method enables setting of porosity of the setter to be relatively easily changed, and ensures a predetermined mechanical strength even with the porosity increased over 50%. The setter for defatting and/or firing has pores with an average diameter of 5–1000 $\mu$m and porosity in the range of 70–25%. The setter is formed of a porous body having a three-dimensional network structure having a flat surface. A porous sheet is preferably laminated on the surface of the porous body having a three-dimensional network structure, the porous sheet having pores, smaller than the pores of the structure body, with an average diameter of not more than 50 $\mu$m and having porosity in the range of 70–25%. The porous body having a three-dimensional network structure or both the structure body and the porous sheet are each preferably made of a material having the same base as a substance to be defatted or formed which is placed on the structure body or the porous sheet.

22 Claims, 1 Drawing Sheet

FIG. 1

SETTER FOR DEFATTING AND/OR FIRING AND METHOD FOR PRODUCING THE SAME

BACKGROUND OF THE INVENTION

1. Field of the Invention

The present invention relates to a setter used as a plate on which electronic materials, ceramic materials, powdery alloy materials, etc. are set when those materials are defatted and/or fired, i.e., a set plate for use in defatting and/or firing a powder compact such as a ceramic in a high-temperature atmosphere. The present invention also relates to a method for producing the same.

2. Description of the Related Art

Heretofore, such a setter has been formed of an oxide or non-oxide base porous body. An oxide base porous body is made of, for example, alumina, zirconia, magnesia, mullite or sialon. A non-oxide base porous body is made of, for example, silicon carbide, silicon nitride, aluminum nitride, or graphite. These porous bodies have porosity in the range of about 20–50%.

Because of the low porosity in the range of about 20–50%, the above conventional setter has a high bulk density and also has a very large heat capacity. In the conventional setter, therefore, most of thermal energy supplied for defatting and/or firing is consumed for heating the setter.

To solve the above problem, methods for producing lightweight setters having porosity not less than 50% are disclosed in, e.g., Japanese Unexamined Patent Publication No. 62-37683, No. 5-270939 and No. 5-310482.

Japanese Unexamined Patent Publication No. 62-37683 proposes a ceramic firing tool wherein a ceramic setting layer is formed on at least a part of the surface of a ceramic foam layer. In the proposed ceramic firing tool, the ceramic foam layer is formed by using a soft polyurethane foam as a base foam of three-dimensional network structure, then repeating steps of depositing, drying and solidifying a ceramic forming slip on a skeleton portion of the base foam several times, and then firing the solidified ceramic to eliminate the skeleton portion.

The ceramic firing tool thus produced can have a small bulk density and hence a small heat capacity because the ceramic foam layer has a high porosity.

Also, Japanese Unexamined Patent Publication No. 5-270939, proposes a method of producing a lightweight setter. The proposed method comprises the steps of preparing a slurry by mixing 10–30 weight % of pyrolyzable resin beads having an average particle size of 100–300 $\mu$m and water in 100 weight % of ceramic powder, then adding and mixing a urethane foaming material in the slurry, then foaming and hardening a resultant mixture, and then defatting and firing the hardened mixture.

The lightweight setter thus produced has high thermal shock resistance (i.e., high spalling resistance), is stable against cooling-heating cycles, and is kept from cracking even when the firing temperature of the functional ceramic is increased or the firing time thereof is shortened, or even when the temperature raising and lowering rates are increased. In addition, the lightweight setter has a practical level of bending strength and also has a small bulk density.

Further, Japanese Unexamined Patent Publication No. 5-310482 proposes a lightweight ceramic green body wherein the surface of a body formed of an oxide or non-oxide base ceramic has smoothness Rmax of less than 5 $\mu$m, a dense layer is formed in an inner region of 50–100 $\mu$m from the surface of the body, and a porous body having porosity of 20–80% and including pores of 10–2000 $\mu$m uniformly distributed is formed to spread from the dense layer to the core. The proposed lightweight ceramic body is produced by adding a foaming solution with bubble diameters of 10–2000 $\mu$m to a slurry of oxide or non-oxide base ceramic powder, then stirring a resultant mixture to introduce bubbles in the slurry, then pouring the slurry into a mold, and then releasing, defatting and firing the molded ceramic.

The lightweight ceramic fired body thus produced has a high surface smoothness and a constant strength in spite of being mainly formed of the porous body. The lightweight ceramic fired body is therefore suitable as a setter for use in firing ceramic materials or the likes.

However, the methods of producing lightweight setters, disclosed in the above-cited Japanese Unexamined Patent Publication No. 62-37683, No. 5-270939 and No. 5-310482, have problems of requiring a mold and generating a large amount of gas from the pyrolyzable resin beads and the urethane foaming material in the defatting and firing step.

SUMMARY OF THE INVENTION

A first object of the present invention is to provide a method of producing a setter for defatting and/or firing, which can produce the setter without using any mold, and which can minimize generation of gas in the step of firing the setter because of using neither pyrolyzable resin beads nor urethane.

A second object of the present invention is to provide a setter for defatting and/or firing and a method of producing the setter, which can easily change setting of porosity, and which can ensure a predetermined mechanical strength even with the porosity increased over 50%.

A third object of the present invention is to provide a setter for defatting and/or firing and a method of producing the setter, which setter is lightweight, is easy to handle and has a small heat capacity, and which method can quickly remove fat and fatty oil from a substance to be formed in the step of defatting the substance to be formed.

A fourth object of the present invention is to provide a setter for defatting and/or firing and a method of producing the setter, which can prevent a lowering in precision of a substance to be defatted or formed, and which can suppress the so-called composition shift, i.e., a migration of constituent elements of the substance to be defatted or formed to the setter side, in the defatting or firing step thereof.

The present invention according to claim 1 resides in a setter for defatting and/or firing wherein the setter is formed of a porous body having a three-dimensional network structure having pores with an average diameter of 5–1000 $\mu$m, having porosity in the range of 70–25%, and having a flat surface.

With the setter for defatting and/or firing according to claim 1, the setter is formed of a porous body having a three-dimensional network structure, and therefore has a high mechanical strength even with the porosity increased over 50%. Also, since the setter has a small bulk density, the heat capacity of the setter can be reduced, and the temperature raising and lowering rates can be increased in the defatting or firing step of a substance to be defatted or formed. Further, since the setter is formed of the porous body having a three-dimensional network structure having the pores communicated with each other, fat and fatty oil emerging to a surface from the substance to be formed in the defatting step thereof are smoothly discharged through the pores and removed from the substance to be formed.

The present invention according to claim 2 resides in a setter for defatting and/or firing as claimed in claim 1, wherein a porous sheet is laminated on the surface of the porous body having a three-dimensional network structure, the porous sheet having pores, smaller than the pores of the structure body, with an average diameter of not more than 50 μm and having porosity in the range of 70–25%.

With the setter for defatting and/or firing according to claim 2, since a porous sheet having the smaller pores and having a high mechanical strength is laminated on the porous body having a three-dimensional network structure, the mechanical strength of the setter can be further improved in its entirety. Also, since a substance to be defatted or formed is placed on the porous sheet having the smaller pores and having a small surface roughness, a lowering in precision of the defatted or formed substance can be prevented even when it has a small size and high precision.

The present invention according to claim 3 resides in a setter for defatting and/or firing according to claim 1 or 2, wherein the porous body having a three-dimensional network structure or both the structure body and the porous sheet are each made of a material having the same base as a substance to be defatted or formed which is placed on the structure body or the porous sheet.

With the setter for defatting and/or firing according to claim 3, since constituent elements of the substance to be defatted or formed are substantially not migrated to the setter in the defatting or firing step thereof, the so-called composition shift of the substance to be defatted or formed can be suppressed.

The present invention according to claim 4 resides in a setter for defatting and/or firing according to any one claims 1 to 3, wherein the porous body having a three-dimensional network structure or both the structure body and the porous sheet are each expressed by the following general formula (1);

$$Ln_{1-x}A0_xB0_{1-y-z}B1_yB2_zO_{3-d} \quad (1)$$

where Ln is at least one selected from the group consisting of La, Ce, Pr, Nd and Sm; A0 is at least one selected from the group consisting of Sr, Ca and Ba; B0 is one of Ga and Al (aluminum); B1 is at least one selected from the group consisting of Mg, Al (aluminum) and In when B0 is Ga, and B1 is at least one selected from the group consisting of Mg and In when B0 is Al (aluminum); B2 is at least one selected from the group consisting of Co, Fe, Ni and Cu; x is from 0.05 to 0.3; y is from 0 to 0.29; z is from 0.01 to 0.3; (y+z) is from 0.01 to 0.3; and d is from 0.03 to 0.445.

The present invention according to claim 5 resides in a setter for defatting and/or firing according to any one of claim 1 to 3, wherein the porous body having a three-dimensional network structure or both the structure body and the porous sheet are each expressed by the following general formula (2);

$$A2_{1-x}Ca_xB0_{1-y}B3_yO_{3-d} \quad (2)$$

where A2 is at least one selected from lanthanide metals having an octa-coordinated trivalent ion radius of 1.05–1.15 Å; B0 is one of Ga and Al (aluminum); B3 is at least one selected from the group consisting of Co, Fe, Ni and cu; x is from 0.05 to 0.3; y is from 0.05 to 0.3; and d is from 0.05 to 0.3.

With the setter for defatting and/or firing according to the claim 4 or 5, when a substance to be defatted or formed is formed of an oxide ion conductor or an oxide ion mixed conductor expressed by the above general formula (1) or (2), the elements of A0, B0, B1, B2, A2, Ca (calcium), B3, etc. contained in the composition of the substance to be defatted or formed are substantially not migrated to the setter in the defatting or firing step thereof. Therefore, the so-called composition shift of the substance to be defatted or formed can be suppressed remarkably.

Note that the term "oxide ion conductor" used in this specification means materials in a narrow sense wherein oxide ion conductivity takes a most part of electrical conductivity, and the term "oxide ion mixed conductor" means materials wherein electron conductivity and oxide ion conductivity each take a large part of electrical conductivity.

Further, in the general formula (1), when z is not greater than 0.15, the materials have large ion transference numbers and are oxide ion conductive materials. However, when z is greater than 0.15, the materials have lower ion transport numbers and are oxide ion mixed conductive materials.

The present invention according to claim 6 resides in a setter for defatting and/or firing according to any one of claims 1 to 5, wherein the pores formed in the porous body having a three-dimensional network structure mainly comprise groups of large-diameter pores with average diameters of 5–1000 μm, and groups of small-diameter pores being smaller than the large-diameter pores and having average diameters of 1–100 μm.

With the setter for defatting and/or firing according to claim 6, since the groups of small-diameter pores are dispersed in a skeleton comprising the groups of large-diameter pores in the porous body having a three-dimensional network structure, the weight of the setter can be further reduced without substantially degrading the mechanical strength.

The present invention according to claim 7 resides in a method of producing a setter for defatting and/or firing, the method comprising the steps of forming a sheet by using a water base slurry containing a water-insoluble organic solvent that has a vapor pressure larger than that of water; vaporizing the solvent for changing the sheet into a porous body having a three-dimensional network structure, and then drying the structure body; and firing the structure body.

With the method of producing a setter for defatting and/or firing according to claim 7, since the organic solvent has a vapor pressure larger than that of water, the organic solvent is evaporated to fly off in vapor or gas. Therefore, a large number of pores are formed in the sheet, whereby the sheet is changed into a porous body having a three-dimensional network structure.

Note that the term "water-insoluble organic solvent" means an organic solvent which has neither properties nor ability to dissolve in water.

The present invention according to claim 8 resides in a method of producing a setter for defatting and/or firing, the method comprising the steps of forming a sheet by using a water base slurry containing a water-insoluble organic solvent that has a vapor pressure larger than that of water; vaporizing the solvent for changing the sheet into a porous body having a three-dimensional network structure, and then drying the structure body; heating and compressing the structure body; and firing the heated and compressed structure body.

With the method of producing a setter for defatting and/or firing according to claim 8, the bulk density of the porous body having a three-dimensional network structure can be optionally controlled by heating and compressing the structure body in the direction of thickness thereof with the heating temperature and pressure as parameters in the heating and compressing step of the structure body. Therefore, a setter can be produced which has porosity in match with the particular need of each customer.

The present invention according to claim 9 resides in a method of producing a setter for defatting and/or firing, the method comprising the steps of forming a sheet by using a water base slurry containing a water-insoluble organic solvent that has a vapor pressure larger than that of water; vaporizing the solvent for changing the sheet into a porous body having a three-dimensional network structure, and then drying the structure body; forming a porous sheet having pores with smaller diameters than the pores of the structure body by employing a non-foam sheet forming process; laminating the porous sheet on the structure body by pressure contact under heating; and firing the laminated structure body.

With the method of producing a setter for defatting and/or firing according to claim 9, the setter according to claim 2, i.e., a laminate of the porous body having a three-dimensional network structure and the porous sheet can be produced efficiently.

DESCRIPTION OF THE PREFERRED EMBODIMENT

An embodiment of the present invention will be described below.

Figure 1:
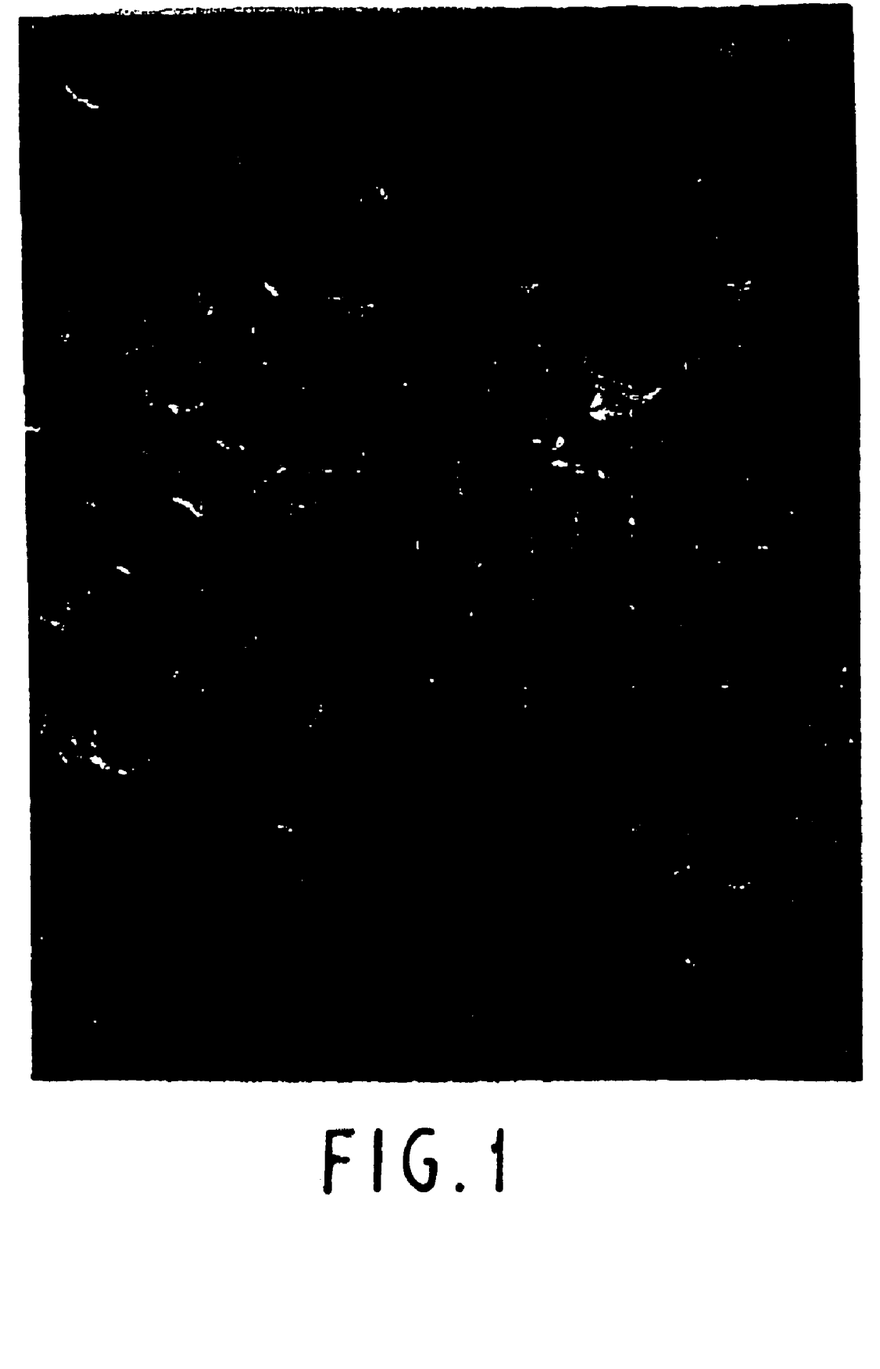
FIG. 1 is a photograph of a porous body having a three-dimensional network structure obtained by Example 1 of the present invention, the photograph being taken by a scanning electron microscope.

A setter for defatting and/or firing according to the present invention is formed of a porous body having a three-dimensional network structure having pores with an average diameter of 5–1000 μm, preferably 10–750 μm, and having porosity in the range of 70–25%, preferably in the range of 70–38%. Also, the setter is formed to have a flat surface. The reason of restricting the average diameter of the pores in the range 5–1000 μm is as follows. If the average diameter is less than 5 μm, the heat capacity of the setter would increase and the defatting capability from a substance to be defatted would deteriorate. If the average diameter exceeds 1000 μm, the mechanical strength of the setter would deteriorate. Further, the reason of restricting the porosity in the range 70–25% is as follows. If the porosity exceeds 70%, the mechanical strength of the setter would deteriorate. If the porosity is less than 25%, the heat capacity of the setter would increase and the defatting capability from a substance to be defatted would deteriorate.

Preferably, a porous sheet is laminated on the surface of the porous body having a three-dimensional network structure, and a substance to be fatted or formed is placed on the porous sheet. The porous sheet has pores, smaller than the pores of the structure body, with an average diameter of not more than 50 μm, preferably in the range of 10–20 μm, and has porosity in the range of 70–25%, preferably in the range of 70–38%. The reason of restricting the average diameter of the pores of the porous sheet to be not more than 50 μm is to reduce the surface roughness of the porous sheet. Further, the reason of restricting the porosity of the porous sheet in the range 70–25% is as follows. If the porosity is less than 25%, the heat capacity of the porous sheet would increase and the defatting capability from the substance to be formed would deteriorate. If the porosity exceeds 70%, the mechanical strength of the porous sheet would deteriorate. Additionally, it is at least required that the pores of the porous sheet establish communication from a front surface to a rear surface of the sheet.

Preferably, the porous body having a three-dimensional network structure or both the structure body and the porous sheet are each made of a material having the same base as a substance to be defatted or formed which is placed on the structure body or the porous sheet.

Particularly, when a substance to be fatted or formed is formed of an oxide ion conductor or an oxide ion mixed conductor expressed by the following general formula (1), the setter of the present invention, i.e., the porous body having a three-dimensional network structure or both the structure body and the porous sheet, are each preferably formed of an oxide ion conductor or an oxide ion mixed conductor expressed by the following general formula (1);

$$Ln_{1-x}A0_xB0_{1-y-z}B1_yB2_zO_{3-d} \qquad (1)$$

In the above general formula (1), Ln represents a lanthanoid base rare-earth metal element and is at least one selected from the group consisting of La, Ce, Pr, Nd and Sm. A0 represents an alkali earth metal and is at least one selected from the group consisting of Sr, Ca and Ba. B0 is one of Ga and Al (aluminum). B1 represents a non-transition metal, and it is at least one selected from the group consisting of Mg, Al (aluminum) and In when B0 is Ga, and B1 is at least one selected from the group consisting of Mg and In when B0 is Al (aluminum). B2 represents a transition metal and is at least one selected from the group consisting of Co, Fe, Ni and Cu. In other words, the oxide ion conductor used in the present invention is a pentad-system (Ln+A0+B0+B1+B2) composite oxide consisting of a lanthanide gallate ($LnGaO_{3-d}$) or lanthanide aluminate ($LnAlO_{3-d}$) as a basic structure, and three kinds of elements, i.e., an alkali earth metal (A0), a non-transition metal (B1) and a transition metal (B2), which are doped in the former.

Also, the oxide ion conductor or the oxide ion mixed conductor expressed by the above general formula (1) has such a perovskite crystal structure that the Ln and A0 elements in the formula (1) occupy the A sites of a perovskite crystal expressed by $ABO_{3-d}$, and the B0, B1 and B2 elements the B sites thereof. Because dyadic metals (e.g., the A0 element occupying the A site and the B1 element occupying the B site) and a transition metal (the B2 element occupying the B site) occupy a part of the A and B sites which are inherently occupied by trivalent metals, oxygen holes occur and oxide ion conductivity indicates due to the occurrence of the oxygen holes. Accordingly, the number of oxygen atoms is reduced corresponding to the number of the oxygen holes occurred.

In the above general formula (1), x represents an atomic ratio of the A0 element and is set to range from 0.05 to 0.3, preferably from 0.10 to 0.25. Also, y represents an atomic ratio of the B1 element and is set to range from 0 to 0.29, preferably from 0.025 to 0.17. Further, z represents an atomic ratio of the B2 element and is set to range from 0.01 to 0.3. When z is set to range from 0.01 to 0.15, preferably from 0.02 to 0.15, an oxide ion conductor is provided, and when z is set to range from 0.15 to 0.3, preferably from 0.15 to 0.25, an oxide ion mixed conductor is provided. Moreover, (y+z) is set to range from 0.01 to 0.3, preferably from 0.10 to 0.25. The reason of restricting x in the range of 0.05–0.3 is that if x is outside the above range, the electrical conductivity would lower. The reason of restricting y in the range of 0–0.29 is that if x exceeds 0.29, the electrical conductivity would lower in a reducing atmosphere. The reason of restricting z in the range of 0.01–0.3 is as follows. As z increases, the electrical conductivity also increases, but the ion transference number (proportion of oxide ion conductivity) lowers. In view of such a characteristic, the above range gives an optimum range of z. The reason of restricting (y+z) in the range of 0.01–0.3 is as follows. As (y+z) increases, the electrical conductivity also increases, but the ion transference number lowers. In view of such a characteristic, the above range gives an optimum range of (y+z). Thus, when a substance to be defatted or formed is made of a material having the same base as the setter which is formed of an oxide ion conductor or an oxide ion mixed conductor expressed by the general formula (1), the substance to be defatted or formed exhibits the optimum electrical conductivity and ion transference number.

Additionally, d is set to range from 0.03 to 0.445. The reason of expressing an oxygen atomic ratio by (3−d) (an actual oxygen atomic ratio is not more than 3) in the general formula (1) is as follows. The number of oxygen holes varies depending upon not only the kinds of added elements (A0, B1 and B2), but also the temperature, the oxygen partial pressure, and the kind and amount of the B2 element. It is therefore difficult to precisely express the oxygen atomic ratio. When Co, Fe, Ni or Cu is used as the B2 element, a high electrical conductivity is obtained even in the low-temperature side (about 650° C.).

Alternatively, the porous body having a three-dimensional network structure or both the structure body and the porous sheet can also be each formed of an oxide ion mixed conductor expressed by the following general formula (2);

$$A2_{1-x}Ca_xB0_{1-y}B3_yO_{3-d} \quad (2)$$

In the above general formula (2), A2 is at least one selected from lanthanide metals having an octa-coordinated trivalent ion radius of 1.05–1.15 Å, and B0 is one of Ga and Al (aluminum). B3 is at least one selected from the group consisting of Co, Fe, Ni and cu. Also, x is set to range from 0.05 to 0.3, preferably from 0.05 to 0.2, and y is set to range from 0.05 to 0.3, preferably from 0.08 to 0.2. Further, d is set to range from 0.05 to 0.3.

The oxide ion mixed conductor expressed by the above general formula (2) is also a material having a perovskite crystal structure. Preferable examples used as the A2 element include Nd, Pr, Sm, Ce, Eu, Gd, etc. Among them, Nd is particularly preferable. The reasons of restricting x in the range of 0.05–0.3 and y in the range of 0.05–0.3 are that if x and y are outside the respective ranges, the electrical conductivity would lower. A body fired substance to be defatted or formed, which is made of a material having the same base as the setter formed of an oxide ion mixed conductor expressed by the above general formula (2), exhibits a higher electrical conductivity than a body fired substance to be defatted or formed which is made of a material having the same base as the setter formed of an oxide ion conductor or an oxide ion mixed conductor expressed by the general formula (1).

On the other hand, the pores formed in the porous body having a three-dimensional network structure mainly comprise groups of large-diameter pores with average diameters of preferably 5–1000 μm, more preferably 10–750 μm, and groups of small-diameter pores being smaller than the large-diameter pores and having average diameters of 1–100 μm, preferably 1–50 μm. The reason of restricting the average diameters of the groups of large-diameter pores in the range of 5–1000 μm is to further reduce the weight of the porous body having a three-dimensional network structure without lowering the mechanical strength of the structure body.

The thus-constructed setter for defatting and/or firing will be described below.

First, a water base slurry for ordinary sheet forming is prepared which contains raw material powder (e.g., ceramic powder) and a water-soluble resin binder. Examples of usable as the material powder include oxide base powder such as alumina, zirconia, magnesia, mullite, sialon and so on, and non-oxide base powder such as silicon carbide, silicon nitride, aluminum nitride, graphite and so on. If the material powder is not commercially available, oxide ion conductor powder or oxide ion mixed conductor powder expressed by the general formula (1) or (2) can be obtained by the following method, for example, when such powder is employed. Compositions expressed by the general formula (1) or (2) or precursors (such as carbonates, carboxylic acid and so on), which are each thermally decomposed into an oxide, are mixed together so as to provide a predetermined composition ratio. A resultant mixture is calcined and then pulverized by a ball mill or the like. The oxide ion conductor powder or the oxide ion mixed conductor powder can be thereby prepared. The average particle size of the raw material powder is preferably in the range of 0.5–500 μm, preferably in the range of 0.5–200 μm.

Then, a water-insoluble organic solvent that has a vapor pressure larger than that of water, a surfactant, a water-soluble resin binder, a plasticizer and water are mixed in the above water base slurry, thereby preparing a slurry containing the water-insoluble organic solvent. This slurry is the same as a water base slurry for use in the ordinary sheet forming process except that the slurry prepared here contains the water-insoluble organic solvent used as a foaming agent. The water-insoluble organic solvent is not particularly restricted so long as it has a vapor pressure larger than that of water. However, the water-insoluble organic solvent is preferably one of hydrocarbon base solvents having the carbon number of 5 to 8. Practical examples of the hydrocarbon base solvents include neopentane, hexane, isohexane, heptane, isoheptane, octane, benzene, toluene and so on.

The surfactant is not particularly restricted, and may be one of neutral detergents used for tableware. Examples of the water-soluble resin binder include methyl cellulose, hydroxypropyl methyl cellulose, hydroxyethyl methyl cellulose, carboxymethyl cellulose ammonium, ethyl cellulose, polyvinyl alcohol and the like. The plasticizer is used as required, and may be selected from among polyhydric alcohols, fats and fatty oils, ethers, and esters. Practical examples of the plasticizer include polyethylene glycol, olive oil, petroleum ether, dinormalbutyl phthalate, sorbitan mono-oleate, glycerin and so on. The mixing ratio of the above components is preferably such that the raw material powder is 5–80 weight %, the water-insoluble organic solvent is 0.05–10 weight %, the water-soluble resin binder is 0.5–20 weight %, the surfactant is 0.05–10 weight %, the plasticizer is not more than 15 weight % (it may be zero), and the rest is water.

The above slurry containing the water-insoluble organic solvent is thoroughly mixed, and a sheet is formed from the slurry by known methods such as the doctor blade method, the slip casting method or the like. By holding the formed sheet at 5–40° C. for 30–180 minutes in the atmosphere, the water-insoluble organic solvent having a vapor pressure higher than water evaporates and vaporizes before the water vaporizes. For example, in case of the above-mentioned hydrocarbon organic solvents used as a water-insoluble organic solvent, vaporization of the organic solvents occurs at a temperature of 5° C. or higher. The drying is preferably carried at a comparatively low temperature, for example, 40° C. or lower so as to avoid a rapid water-vaporization. As the solvent which vaporizes is dispersed in the slurry, large air bubbles which are generated by volume expansion at the time of the solvent evaporation remain in the sheet after vaporization. When water has also been vaporized and the drying treatment is finished, a porous foaming sheet is obtained which has a three-dimensional network structure generated by the large gas bubbles. The size of the gas bubbles is remarkably larger than the particle size of the raw material powder and is comparatively uniform. The structure body is strong enough to handle even though the porosity of the body is large as the resin binder and plasticizer are included therein.

After drying the structure body, it is fired in an air atmosphere when an oxide base material is used, and in a vacuum or nitrogen gas atmosphere when a non-oxide base material is used. The three-dimensional network porous structure is maintained as it is after the firing. Before the firing, the structure body may be subjected to defatting to remove organic matters (such as the binder, the plasticizer and the surfactant) from the sheet by heating it to a temperature lower than the firing temperature. The porous body having a three-dimensional network structure obtained after the firing includes a number of large pores (groups of large-diameter pores) which are much greater than the particle size of the material powder forming a skeleton, and therefore has a three-dimensional network porous structure. In addition to the groups of larger-diameter pores, there are also a number of small pores (groups of small-diameter pores) because the skeleton itself is a porous body formed by firing the material powder.

Further, the bulk density of the porous body having a three-dimensional network structure can be optionally controlled by heating and compressing the structure body before the firing in the direction of thickness thereof using a hot press with the heating temperature and pressure as parameters.

Moreover, the setter may be produced by forming a porous sheet having pores with smaller diameters than the pores of the structure body by employing a non-foam sheet forming process such as a pore former addition process, for example, then laminating the porous sheet on the structure body to form a laminate by pressure contact under heating, and then firing the laminated structure body. The pore former addition process means a process of adding particulate or bead-like organic matters, called pore formers, to ceramic powder beforehand, compacting the powder, defatting a resultant compact to remove the organic matters, and firing the compact, thereby producing a sheet with pores formed therein. The porous sheet produced by the pore former addition process has small pores not larger than 50 μm, and therefore has a smaller surface roughness than the porous body having a three-dimensional network structure.

The thus-produced setter for defatting and/or firing has a three-dimensional network porous structure, and therefore has a high mechanical strength even with the porosity increased over 50%. Also, the thickness of the setter can be set smaller than conventional. As a result, a setter can be obtained which is lightweight, is easy to handle, and can contribute to holding down the material cost and the production cost.

In addition, by attaching the porous sheet, which has a small surface roughness and is formed by the non-foam sheet forming process such as the pore former addition process, to the porous body having a three-dimensional network structure by pressure contact under heating as required, a setter for defatting and/or firing can be produced which has a further improved mechanical strength and a small surface roughness.

EXAMPLES

Examples of the present invention will be described below in detail along with Comparative Examples.

Example 1

First, 44.4 weight % of alumina powder as the material powder, 2.3 weight % of hexane as the water-insoluble organic solvent, 8.9 weight % of neutral detergent for tableware, 4.4 weight % of methyl cellulose as the water-soluble resin binder, 4.4 weight % of glycerin as the plasticizer, and 35.6 weight % of water were mixed together to prepare a water base slurry containing the water-insoluble organic solvent, and a sheet having a thickness of 3 mm was formed using the slurry by the doctor blade method.

Then, the sheet was held at a temperature of 30° C. for one hour. During the holding period, the hexane as the water-insoluble organic solvent in the sheet was evaporated to fly off in gas, and a number of fine pores having a uniform size were formed in the sheet. A porous body having a three-dimensional network structure having a thickness of 12 mm was thereby obtained. After drying, the structure body was heated and compressed by a hot press so as to provide porosity of 70%. Thereafter, by firing the compressed structure body at 1650° C. for 10 hours in the atmosphere, a setter for defatting and/or firing was obtained which had a three-dimensional network porous structure. This setter was referred to as Example 1. A photograph of this setter taken by a scanning electron microscope is shown in FIG. 1.

Example 2

A setter was produced in the same manner as in Example 1 except that the porous body having a three-dimensional network structure having a thickness of 12 mm was heated and compressed by the hot press so as to provide porosity of 62%. This setter was referred to as Example 2.

Example 3

A setter was produced in the same manner as in Example 1 except that the porous body having a three-dimensional network structure having a thickness of 12 mm was heated and compressed by the hot press so as to provide porosity of 58%. This setter was referred to as Example 3.

Example 4

A setter was produced in the same manner as in Example 1 except that the porous body having a three-dimensional network structure having a thickness of 12 mm was heated and compressed by the hot press so as to provide porosity of 50%. This setter was referred to as Example 4.

Example 5

A setter was produced in the same manner as in Example 1 except that the porous body having a three-dimensional network structure having a thickness of 12 mm was heated and compressed by the hot press so as to provide porosity of 46% This setter was referred to as Example 5.

Example 6

A setter was produced in the same manner as in Example 1 except that the porous body having a three-dimensional network structure having a thickness of 12 mm was heated and compressed by the hot press so as to provide porosity of 38%. This setter was referred to as Example 6.

Example 7

A setter was produced in the same manner as in Example 1 except that the porous body having a three-dimensional network structure having a thickness of 12 mm was heated and compressed by the hot press so as to provide porosity of 32%. This setter was referred to as Example 7.

Example 8

A setter was produced in the same manner as in Example 1 except that the porous body having a three-dimensional network structure having a thickness of 12 mm was heated and compressed by the hot press so as to provide porosity of 25%. This setter was referred to as Example 8.

Example 9

A setter was produced in the same manner as in Example 1 except that after heating and compressing a porous body having a three-dimensional network structure having a composition of $La_{0.8}Sr_{0.2}Al_{0.8}Mg_{0.15}Co_{0.05}O_3$ by the hot press so as to provide porosity of 50%, the compressed structure body was fired at 1500° C. for 10 hours in the atmosphere. This setter was referred to as Example 9.

Example 10

A setter was produced in the same manner as in Example 9 except that a porous body having a three-dimensional network structure having a composition of $La_{0.85}Sr_{0.15}Al_{0.82}Mg_{0.14}Co_{0.04}O_3$ was employed. This setter was referred to as Example 10.

Example 11

A setter was produced in the same manner as in Example 9 except that a porous body having a three-dimensional network structure having a composition of $La_{0.85}Sr_{0.15}Al_{0.85}Mg_{0.12}Co_{0.03}O_3$ was employed. This setter was referred to as Example 11.

Example 12

A setter was produced in the same manner as in Example 9 except that a porous body having a three-dimensional network structure having a composition of $La_{0.85}Sr_{0.15}Al_{0.9}Mg_{0.08}Co_{0.02}O_3$ was employed. This setter was referred to as Example 12.

Example 13

A setter was produced in the same manner as in Example 9 except that a porous body having a three-dimensional network structure having a composition of $La_{0.8}Sr_{0.2}Ga_{0.8}Mg_{0.15}Co_{0.05}O_3$ was employed. This setter was referred to as Example 13.

Comparative Example 1

A setter was produced in the same manner as in Example 1 except that a porous body having a three-dimensional network structure having a thickness of 12 mm was fired without heating and compressing it. This setter was referred to as Comparative Example 1.

Comparative Example 2

A setter was produced in the same manner as in Example 1 except that a porous body having a three-dimensional network structure having a thickness of 12 mm was heated and compressed by the hot press so as to provide porosity of 80%. This setter was referred to as Comparative Example 2.

Comparative Example 3

A setter was produced in the same manner as in Example 1 except that a porous body having a three-dimensional network structure having a thickness of 12 mm was heated and compressed by the hot press so as to provide porosity of 75%. This setter was referred to as Comparative Example 3.

Comparative Example 4

A setter having a composition of $Al_2O_3$ was produced. This setter was referred to as Comparative Example 4.

Comparative Example 5

A setter having a composition of $CaO—ZrO_2$ was produced. This setter was referred to as Comparative Example 5.

Comparison Test 1 and Evaluation

The porosity and the bending strength at the room temperature were measured for each of the setters of Examples 1 to 8 and Comparative Examples 1 to 3. The porosity of each setter was calculated from the weight and volume of the setter, and the bending strength was measured by a three-point bending test machine using a test piece having a size in accordance with the Japanese Industrial Standards (JIS). The specified size of a setter test piece subjected to the three-point bending test machine was 3 mm thick, 4 mm wide, and not less than 36 mm long. For the setters of Examples 1 to 8 and Comparative Example 3 each having a thickness less than 3 mm, therefore, several sheets of setters were laid one above another and joined together by pressure contact under heating. A resultant laminate was machined so that the test piece had a thickness of 3 mm, a width of 4 mm, and a length of not less than 36 mm. Also, for the setter of Comparative Example 1 having a thickness more than 3 mm, the setter was machined so that the test piece had a thickness of 3 mm, a width of 4 mm, and a length of not less than 36 mm. Further, for the setter of Comparative Example 2 having a thickness of 3 mm, the setter was machined so that the test piece had a width of 4 mm and a length of not less than 36 mm, while the thickness was kept as it was. Table 1 lists the measured results, including a compression rate P of each setter. The compression rate P of the setter was calculated based on a formula $P=(T_2/T_1) \& times; 100 (\%)$ where the thicknesses of the setter before and after heating and compressing the setter are respectively $T_1$ and $T_2$.

TABLE 1

|  | Compression Rate of Setter (%) | Sintering Temperature (° C.) | Porosity (%) | Bending Strength at Room Temp. (MPa) |
|---|---|---|---|---|
| Example 1 | 17 | 1650 | 70 | 10 |
| Example 2 | 15 | 1650 | 62 | 15 |
| Example 3 | 13 | 1650 | 58 | 25 |
| Example 4 | 11 | 1650 | 50 | 40 |
| Example 5 | 8 | 1650 | 46 | 65 |
| Example 6 | 6 | 1650 | 38 | 82 |
| Example 7 | 5 | 1650 | 32 | 100 |
| Example 8 | 4 | 1650 | 25 | 115 |
| Comp. Ex. 1 | 100 | 1650 | 95 | — |

TABLE 1-continued

|  | Compression Rate of Setter (%) | Sintering Temperature (° C.) | Porosity (%) | Bending Strength at Room Temp. (MPa) |
|---|---|---|---|---|
| Comp. Ex. 2 | 25 | 1650 | 80 | 2 |
| Comp. Ex. 3 | 20 | 1650 | 75 | 6 |

As is apparent from Table 1, the setters of Comparative Examples 1 to 3 having the porosity over 70% have a low bending strength, while the setters of Examples 1 to 8 having the porosity in the range of 70%–25% have a bending strength not less than the predetermined value.

Comparison Test 2 and Evaluation

A sheet (substance to be fired) having a film thickness of 50 $\mu$m and a composition of $La_{0.8}Sr_{0.2}Ga_{0.8}Mg_{0.15}Co_{0.05}O_3$ was placed on each of the setters of Examples 9 to 13 and Comparative Examples 4 and 5. The sheet was then fired by holding it at 1450° C. for 6 hours in the atmosphere. The composition of each fired sheet (substance to be fired) was analyzed. The results are listed in Table 2.

TABLE 2

| | Composition of Fired Sheet (Substance to be Fired) (weight %) | | | | | | | |
|---|---|---|---|---|---|---|---|---|
| | La | Sr | Ga | Mg | Co | Al | Zr | Ca |
| Theoretical Value | 47.1 | 7.43 | 23.7 | 1.55 | 1.25 | — | — | — |
| Example 9 | 46.7 | 8.32 | 23.3 | 1.59 | 1.63 | 0.02 | — | — |
| Example 10 | 47.2 | 7.45 | 23.2 | 1.55 | 1.28 | 0.02 | — | — |
| Example 11 | 47.2 | 7.46 | 23.1 | 1.50 | 1.20 | 0.02 | — | — |
| Example 12 | 47.3 | 7.45 | 23.2 | 1.25 | 0.98 | 0.02 | — | — |
| Example 13 | 47.2 | 7.40 | 23.6 | 1.55 | 1.24 | — | — | — |
| Comp. Ex. 4 | 50.1 | 5.25 | 24.0 | 1.51 | 0.91 | 0.01 | — | — |
| Comp. Ex. 5 | 51.3 | 5.81 | 24.3 | 1.08 | 1.93 | — | 0.04 | 0.02 |

As is apparent from Table 2, the sheets of Comparative Examples 4 and 5 each exhibit a large shift in element ratio of the composition from the theoretical values, while the sheets of Examples 9 to 13 each exhibit a smaller shift in element ratio of the composition from the theoretical values as compared with Comparative Examples 4 and 5.

According to the present invention, as described above, since a setter is formed of a porous body having a three-dimensional network structure having a flat surface, having pores with an average diameter of 5–1000 $\mu$m, and having porosity in the range of 70–25%, the setter has a high mechanical strength even with the porosity increased over 50%. As a result, the thickness of the setter can be reduced, whereby the weight of the setter is lessened and the setter is easier to handle. This contributes to reducing the cost of the raw materials for use in producing the setter, and hence reducing the production cost of the setter. Also, since the setter has a small bulk density, the heat capacity of the setter can be reduced, and the temperature raising and lowering rates can be increased in the defatting or firing step of a substance to be defatted or formed. Consequently, the time required for the defatting or firing step of a substance to be defatted or formed can be shortened, and therefore the production cost of the defatted or fired substance can be cut down. Further, since the setter is formed of the porous body having a three-dimensional network structure having the pores communicated with each other, fat and fatty oil emerging to a surface of the structure body from the substance to be formed in the defatting step thereof are smoothly discharged through the pores. As a result, fat and fatty oil can be quickly removed from the substance to be formed.

Further, by laminating a porous sheet on the surface of the porous body having a three-dimensional network structure, the porous sheet having pores, smaller than the pores of the structure body, with an average diameter of not more than 50 $\mu$m and having porosity in the range of 70–25%, a substance to be defatted or formed is placed on the porous sheet having the smaller pores and having a small surface roughness. Therefore, a lowering in precision of the defatted or formed substance can be prevented even when it has a small size and high precision.

Still further, by making the porous body having a three-dimensional network structure, etc. of a material having the same base as a substance to be defatted or formed which is placed on the structure body, etc., constituent elements of the substance to be defatted or formed are substantially not migrated to the setter in the defatting or firing step thereof, and therefore the so-called composition shift of the substance to be defatted or formed can be suppressed. In particular, by forming the porous body having a three-dimensional network structure, etc. of an oxide ion conductor or an oxide ion mixed conductor, the following advantage is obtained. When a substance to be fatted or formed is formed of an oxide ion conductor or an oxide ion mixed conductor, the elements of A0, B0, B1, B2 A2, Ca (calcium), B3, etc. contained in the composition of the substance to be defatted or formed are substantially not migrated to the setter in the defatting or firing step thereof. Therefore, the so-called composition shift of the substance to be defatted or formed can be suppressed remarkably. In addition, by using inexpensive Al (aluminum) as the B0 element instead of expensive Ga, a remarkable cost reduction of the raw materials for use in producing the setter can be achieved.

Still further, by forming the pores in the porous body having a three-dimensional network structure such that the pores mainly comprise groups of large-diameter pores with average diameters of 5–1000 $\mu$m and groups of small-diameter pores being smaller than the large-diameter pores and having average diameters of 1–100 $\mu$m, the groups of small-diameter pores are dispersed in a skeleton demarcating the groups of large-diameter pores in the porous body having a three-dimensional network structure. Accordingly, the weight of the setter can be further reduced without substantially degrading the mechanical strength.

Still further, by producing the setter through the steps of forming a sheet by using a water base slurry containing a water-insoluble organic solvent that has a vapor pressure larger than that of water, then vaporizing the solvent for changing the sheet into a porous body having a three-dimensional network structure, and then drying and firing the structure body, generation of gas in the step of firing the setter can be minimized because of using neither pyrolyzable resin beads nor urethane. Additionally, since the setter is produced without using any mold, the production cost of the setter can be reduced.

Still further, by producing the setter through the steps of forming the porous body having a three-dimensional network structure with the sheet forming process, and then heating and compressing the structure body, it is possible to optionally control the bulk density of the porous body having a three-dimensional network structure by heating and compressing the structure body in the direction of thickness thereof with the heating temperature and pressure as parameters in the heating and compressing step of the structure body. Therefore, a setter can be produced which has porosity in match with the particular need of each customer.

Still further, by producing the setter through the steps of forming the porous body having a three-dimensional network structure with the sheet forming process, then laminating a porous sheet having pores with smaller diameters than the pores of the structure body on the structure body by pressure contact under heating, and then firing the laminated structure body, a laminate of the porous body having a three-dimensional network structure and the porous sheet can be produced efficiently.

What is claimed is:

1. A setter for defatting and/or firing comprising a porous body having a three-dimensional network structure and having pores with an average diameter of 5–1000 μm, having porosity in the range of 70–25%, and having a flat surface, wherein the porous body comprises the following material of formula (1);

$$Ln_{1-x}A0_xB0_{1-y-z}B1_yB2_zO_{3-d} \qquad (1)$$

where
Ln is at least one element selected from the group consisting of La, Ce, Pr, Nd and Sm;
A0 is at least one element selected from the group consisting of Sr, Ca and Ba;
B0 is one of Ga and Al (aluminum);
B1 is at least one element selected from the group consisting of Mg, Al (aluminum) and In when B0 is Ga, and B1 is at least one element selected from the group consisting of Mg and In when B0 is Al (aluminum);
B2 is at least one element selected from the group consisting of Co, Fe, Ni and Cu;
x is from 0.05 to 0.3;
y is from 0 to 0.29;
z is from 0.01 to 0.3;
(y+z) is from 0.01 to 0.3; and
d is from 0.03 to 0.445.

2. A setter for defatting and/or firing according to claim 1, wherein a porous sheet is laminated on the surface of said porous body having a three-dimensional network structure, said porous sheet having pores, smaller than the pores of said structure body, with an average diameter of not more than 50 μm and having porosity in the range of 70–25%.

3. A setter for defatting and/or firing according to claim 1, wherein said porous body having a three-dimensional network structure and said substance to be defatted or formed which is placed on said setter comprise the same material.

4. A setter for defatting and/or firing according to claim 1, wherein the pores formed in said porous body having a three-dimensional network structure mainly comprise groups of large-diameter pores with average diameters of 10–1000 μm, and groups of small-diameter pores being smaller than the large-diameter pores and having average diameters of 1–100 μm.

5. A method of producing the setter for defatting and/or firing of claim 1, comprising the steps of:
forming a sheet from a water base slurry comprising a water-insoluble organic solvent that has a vapor pressure larger than that of water, a powder of a material of formula (1), a water-soluble resin binder, and a plasticizer;
vaporizing said solvent, thereby changing said sheet into a porous body having a three-dimensional network structure;
drying said porous body; and
firing said porous body.

6. A method of producing the setter for defatting and/or firing of claim 1, comprising the steps of:
forming a sheet from a water base slurry comprising a water-insoluble organic solvent that has a vapor pressure larger than that of water, a powder of a material of formula (1), a water-soluble resin binder, and a plasticizer;
vaporizing said solvent, thereby changing said sheet into a porous body having a three-dimensional network structure;
drying said porous body;
heating and compressing said porous body; and
firing said heated and compressed porous body.

7. A method of producing the setter for defatting and/or firing of claim 2, comprising the steps of:
forming a sheet from a water base slurry comprising a water-insoluble organic solvent that has a vapor pressure larger than that of water, a powder of a material of formula (1), a water-soluble resin binder, and a plasticizer;
vaporizing said solvent, thereby changing said sheet into a porous body having a three-dimensional network structure;
drying said porous body;
forming a porous sheet having pores with smaller diameters than the pores of said structure body with a non-foam sheet forming process;
laminating said porous sheet on said porous body by pressure contact under heating; and
firing said laminated porous body.

8. A setter for defatting and/or firing comprising a porous body having a three-dimensional network structure and having pores with an average diameter of 5–1000 μm, having porosity in the range of 70–25%, and having a flat surface, wherein said porous body comprises the following material of formula (2);

$$A2_{1-x}Ca_xB0_{1-y}B3_yO_{3-d} \qquad (2)$$

where
A2 is at least one element selected from lanthanide metals having an octa-coordinated trivalent ion radius of 1.05 to 1.15 Å;
B0 is one of Ga and Al (aluminum);
B3 is at least one element selected from the group consisting of Co, Fe, Ni and Cu;

x is from 0.05 to 0.3;

y is from 0.05 to 0.3; and d is from 0.05 to 0.3.

9. A setter for defatting and/or firing according to claim 8, wherein a porous sheet is laminated on the surface of said porous body having a three-dimensional network structure, said porous sheet having pores, smaller than the pores of said structure body, with an average diameter of not more than 50 μm and having porosity in the range of 70–25%.

10. A setter for defatting and/or firing according to claim 8, wherein said porous body having a three-dimensional network structure and said substance to be defatted or formed which is placed on said setter comprise the same material.

11. A setter for defatting and/or firing according to claim 8, wherein the pores formed in said porous body having a three-dimensional network structure mainly comprise groups of large-diameter pores with average diameters of 10–1000 μm, and groups of small-diameter pores being smaller than the large-diameter pores and having average diameters of 1–100 μm.

12. A setter for defatting and/or firing comprising a porous body having a three-dimensional network structure and having pores with an average diameter of 5–1000 μm, having porosity in the range of 70–25%, and having a flat surface, wherein the pores formed in said porous body having a three-dimensional network structure mainly comprise groups of large-diameter pores with average diameters of 10–1000 μm, and groups of small-diameter pores being smaller than the large-diameter pores and having average diameters of 1–100 μm.

13. A setter for defatting and/or firing according to claim 12, wherein a porous sheet is laminated on the surface of said porous body having a three-dimensional network structure, said porous sheet having pores, smaller than the pores of said structure body, with an average diameter of not more than 50 μm and having porosity in the range of 70–25%.

14. A setter for defatting and/or firing according to claim 12, wherein said porous body having a three-dimensional network structure and said substance to be defatted or formed which is placed on said setter comprise the same material.

15. A setter for defatting and/or firing according to claim 12, wherein said porous body having a three-dimensional network structure or both said structure body and said porous sheet comprise the following material of formula (1);

$$Ln_{1-x}A0_xB0_{1-y-z}B1_yB2_zO_{3-d} \quad (1)$$

where

Ln is at least one element selected from the group consisting of La, Ce, Pr, Nd and Sm;

A0 is at least one element selected from the group consisting of Sr, Ca and Ba;

B0 is one of Ga and Al (aluminum);

B1 is at least one element selected from the group consisting of Mg, Al (aluminum) and In when B0 is Ga, and B1 is at least one element selected from the group consisting of Mg and In when B0 is Al (aluminum);

B2 is at least one element selected from the group consisting of Co, Fe, Ni and Cu;

x is from 0.05 to 0.3;

y is from 0 to 0.29;

z is from 0.01 to 0.3;

(y+z) is from 0.01 to 0.3; and d is from 0.03 to 0.445.

16. A setter for defatting and/or firing according to claim 14, wherein said porous body having a three-dimensional network structure or both said structure body and said porous sheet are each expressed by the following general formula (2);

$$A2_{1-x}Ca_xB0_{1-y}B3_yO_{3-d} \quad (2)$$

where

A2 is at least one element selected from lanthanide metals having an octa-coordinated trivalent ion radius of 1.05 to 1.15 Å;

B0 is one of Ga and Al (aluminum);

B3 is at least one element selected from the group consisting of Co, Fe, Ni and Cu;

x is from 0.05 to 0.3;

y is from 0.05 to 0.3; and d is from 0.05 to 0.3.

17. A method of producing the setter for defatting and/or firing of claim 8, comprising the steps of:

forming a sheet from a water base slurry comprising a water-insoluble organic solvent that has a vapor pressure larger than that of water, a powder of a material of formula (2), a water-soluble resin binder, and a plasticizer;

vaporizing said solvent, thereby changing said sheet into a porous body having a three-dimensional network structure;

drying said porous body; and firing said porous body.

18. A method of producing the setter for defatting and/or firing of claim 8, comprising the steps of:

forming a sheet from a water base slurry comprising a water-insoluble organic solvent that has a vapor pressure larger than that of water, a powder of a material of formula (2), a water-soluble resin binder, and a plasticizer;

vaporizing said solvent, thereby changing said sheet into a porous body having a three-dimensional network structure;

drying said porous body;

heating and compressing said porous body; and firing said heated and compressed porous body.

19. A method of producing the setter for defatting and/or firing of claim 9, comprising the steps of:

forming a sheet from a water base slurry comprising a water-insoluble organic solvent that has a vapor pressure larger than that of water, a powder of a material of formula (2), a water-soluble resin binder, and a plasticizer;

vaporizing said solvent, thereby changing said sheet into a porous body having a three-dimensional network structure;

drying said porous body;

forming a porous sheet having pores with smaller diameters than the pores of said structure body with a non-foam sheet forming process;

laminating said porous sheet on said porous body by pressure contact under heating; and firing said laminated porous body.

20. A method of producing the setter for defatting and/or firing of claim 12, comprising the steps of:

forming a sheet from a water base slurry comprising a water-insoluble organic solvent that has a vapor pressure larger than that of water, a raw material powder, a water-soluble resin binder, and a plasticizer;

vaporizing said solvent, thereby changing said sheet into a porous body having a three-dimensional network structure;

drying said porous body; and firing said porous body.

21. A method of producing the setter for defatting and/or firing of claim 12, comprising the steps of:

forming a sheet from a water base slurry comprising a water-insoluble organic solvent that has a vapor pressure larger than that of water, a raw material powder, a water-soluble resin binder, and a plasticizer;

vaporizing said solvent, thereby changing said sheet into a porous body having a three-dimensional network structure;

drying said porous body;

heating and compressing said porous body; and firing said heated and compressed porous body.

22. A method of producing the setter for defatting and/or firing of claim 13, comprising the steps of:

forming a sheet from a water base slurry comprising a water-insoluble organic solvent that has a vapor pressure larger than that of water, a raw material powder, a water-soluble resin binder, and a plasticizer;

vaporizing said solvent, thereby changing said sheet into a porous body having a three-dimensional network structure;

drying said porous body;

forming a porous sheet having pores with smaller diameters than the pores of said structure body with a non-foam sheet forming process;

laminating said porous sheet on said porous body by pressure contact under heating; and firing said laminated porous body.

* * * * *

UNITED STATES PATENT AND TRADEMARK OFFICE
CERTIFICATE OF CORRECTION

PATENT NO. : 6,387,480 B1
DATED : May 14, 2002
INVENTOR(S) : Komada et al.

It is certified that error appears in the above-identified patent and that said Letters Patent is hereby corrected as shown below:

<u>Title page,</u>
Item [30], the Foreign Application Priority Data should read:
-- [30]      Foreign Application Priority Data
Feb. 26, 1999   (JP) ……………………….. 11-049668
Oct. 29, 1999   (JP) ……………………….. 11-309631
Feb. 10, 2000   (JP) ……………….………. 2000-032572 --

Signed and Sealed this

Fifteenth Day of October, 2002

*Attest:*

*Attesting Officer*

JAMES E. ROGAN
*Director of the United States Patent and Trademark Office*